United States Patent [19]

Westling et al.

[11] Patent Number: 5,322,719

[45] Date of Patent: Jun. 21, 1994

[54] MANUFACTURING APPARATUS AND METHOD

[75] Inventors: Neil T. Westling, Foreston; Douglas A. Turk, Minnetonka, both of Minn.

[73] Assignee: Nott Company, Minneapolis, Minn.

[21] Appl. No.: 836,520

[22] Filed: Feb. 21, 1992

[51] Int. Cl.$^5$ ............................................. B25B 11/00
[52] U.S. Cl. ................................... 428/34.1; 269/20; 269/21; 269/22; 428/68; 428/69; 428/76; 428/100; 428/119; 428/120; 428/212; 428/217; 428/446; 428/447; 428/450; 428/451
[58] Field of Search ............... 428/34.1, 447, 100, 428/68, 69, 446, 450, 451, 119, 120, 217, 212, 76; 269/21, 22, 20; 164/395, 392, 368.1

[56] References Cited

U.S. PATENT DOCUMENTS

| | | | |
|---|---|---|---|
| 1,457,530 | 6/1923 | Larsen | 355/91 |
| 1,550,499 | 8/1925 | Buck | 378/187 |
| 2,245,961 | 6/1941 | Clay | 160/395 |
| 2,398,303 | 4/1946 | Glassey | 355/91 |
| 3,073,268 | 1/1963 | Cole | 228/42 |
| 3,205,547 | 9/1965 | Riekse | 24/462 |
| 3,251,399 | 5/1966 | Grossman | 160/180 |
| 3,259,046 | 7/1966 | Nishimura | 354/283 |
| 3,371,702 | 3/1968 | Keegan et al. | 160/392 |
| 3,506,747 | 4/1970 | Creskoff | 264/87 |
| 3,962,805 | 6/1976 | Hamu | 38/102.5 |
| 3,991,806 | 11/1976 | Abell | 160/90 |
| 4,103,728 | 8/1978 | Burdette et al. | 160/368.1 |
| 4,410,168 | 10/1983 | Gotman | 269/21 |
| 4,423,851 | 1/1984 | Heitmann | 248/362 |
| 4,676,633 | 6/1987 | Burgess et al. | 355/91 |
| 4,778,326 | 10/1988 | Althouse et al. | 414/786 |
| 4,822,651 | 4/1989 | Newson | 428/36.8 |
| 4,824,513 | 4/1989 | Dodds | 269/21 |

FOREIGN PATENT DOCUMENTS 1309720  3/1973  United Kingdom .

OTHER PUBLICATIONS

Exhibit AA–"Mosites Vacuum Cavity Seal System", Mosites Rubber Company, Inc., 3 pages.

CHR Industries document, entitled "Aircraft/Aerospace Materials", 4 pages, labelled Apr. 1984 (Exhibit A).

CHR Industries document, entitled "Aircraft/Aerospace Materials", 4 pages, labelled Mar. 1986 (Exhibit B).

(List continued on next page.)

Primary Examiner—Ellis P. Robinson
Assistant Examiner—Nasser Ahmad
Attorney, Agent, or Firm—Merchant, Gould, Smith, Edell, Welter & Schmidt

[57] ABSTRACT

The present invention relates to an apparatus and method for manufacturing products such as laminates or thermal moldings. The apparatus includes a first member, a flexible sheet, and a cord and channel arrangement to mount the flexible sheet to the first member to form an enclosed chamber. Valve structure is provided in airflow communication with the enclosed chamber. The apparatus may be used as a vacuum frame apparatus wherein the enclosed chamber receives product for exposure to a vacuum environment. Heat may be applied to facilitate manufacturing. External force may be provided to the product through external mechanical structure or an external pressure greater than atmospheric pressure external of the enclosed chamber. In another embodiment, the apparatus may be used as a membrane press wherein the product is outside the enclosed chamber and the enclosed chamber is pressurized to a pressure greater than atmospheric pressure such that the flexible sheet, sometimes heated, is pressed against the product. Sometimes a vacuum assist may be provided to draw the flexible sheet toward the product.

18 Claims, 7 Drawing Sheets

OTHER PUBLICATIONS

Airtech International, Inc. document, entitled "The Most Complete Line of Materials for Printed Circuit Board Fabrication", 2 pages (Exhibit C).

SAMPE Journal article, entitled "Thermoforming of Thermoplastic Matrix Composites", vol. 28, No. 2, Mar./Apr. 1992, pp. 9-13 (Exhibit D).

Document entitled "Design Handbook-Reusable Vacuum Bagging Systems", Copyright Cosby M. Newsom, Norwalk, Calif. 1986, revision 4, 1991, cover pages and pp. 1-21 (Exhibit E).

Richmond Aircraft Products document, entitled "Advanced Solutions for Advanced Composites", 1 page (Exhibit F).

Zip-Vac document, entitled "Reusable Vacuum and Pressure Bagging Systems for Composites Production", 4 pages, (Exhibit G).

Schnee-Moorehead document, entitled "Vacuum Bag Sealants", 1 page (Exhibit H).

Arlon Silicon Technologies Division document, entitled "ManiVac TM Vacuum Systems for Composite Structure Fabrication", 8 pages (Exhibit I).

MANUFACTURING APPARATUS AND METHOD

FIELD OF THE INVENTION

The present invention relates to apparatus and methods for use in manufacturing processes requiring a pressure environment different than atmospheric pressure. In particular, the present invention relates to an apparatus including a first member and a flexible second member, with the flexible second member mounted to the first member with a cord and channel arrangement, thereby forming an enclosed chamber therebetween. The flexible second member is movable as the enclosed chamber is supplied with pressures different from atmospheric pressure.

BACKGROUND OF THE INVENTION

Various manufacturing processes are known which require a vacuum environment (pressures less than atmospheric pressure). Vacuum environments are useful in manufacturing printed circuit boards with multiple layers adhesively attached to one another. The vacuum environment facilitates removal of air, or air and moisture, from between the layers.

Vacuum environments are also useful in manufacturing laminate structures of composite materials, such as for use in manufacturing aircraft. Glass laminate structures also may be assembled in a vacuum environment. Thermal molding, where a polymeric layer is heated and shaped around a mold, may also be performed in a vacuum environment.

In manufacturing the above products and other products, it is often important to provide an appropriate vacuum environment to facilitate removal of air, or air and moisture, between the layers of material in the product to be manufactured. Heat and/or external force may be applied to facilitate manufacture.

Apparatus are known for creating a vacuum environment. One example of a known vacuum apparatus includes an arrangement with a flexible top sheet and a flexible bottom sheet adhesively bonded together with caulk. A product for exposure to the vacuum environment is placed between the top and bottom sheets prior to completely closing the arrangement with the caulk. A valve permits withdrawal of air, or air and moisture, from the enclosed chamber between top and bottom sheets. Vacuum arrangements of this type are sometimes referred to as "turkey bags".

Various problems exist with the above vacuum arrangement. One problem is that the arrangement is not reusable. Further, setup prior to forming the vacuum environment is often difficult and time consuming since the top sheet and the bottom sheet must be adhesively caulked together. Sometimes caulk particles are drawn into the valve during use, causing problems with the vacuum supply. Another problem with the arrangement is that stacking of multiple arrangements for simultaneous manufacture is difficult, or impossible, due to the location of the valve through one of the flexible sheets, and a lack of rigidity of the structure. Sometimes the flexible sheets are very thin and are subject to being easily punctured.

Another example of a known vacuum apparatus includes an arrangement with a metal top plate and a metal bottom plate. A seal arrangement, including at least one flexible seal, is positioned between the top and bottom plates to form an enclosed chamber. A product to be exposed to the vacuum environment is placed within the enclosed chamber between the top and bottom plates and the seal arrangement. A valve is provided to withdraw air, or air and moisture, from the enclosed chamber. Vacuum arrangements of this type are sometimes referred to as "vacuum frame assemblies".

Since the second type of vacuum arrangement includes rigid top and bottom plates, neither structure can conform to a non-parallel surface on the product. If an external compressive force is to be applied to the exterior of the top and bottom plates to facilitate manufacturing through mechanical assistance, the height of the seal arrangement is critical relative to the size of product. In addition, the flexible seals must be replaced after a period of time due to fatigue, since typical usage produces significant deformation of the seal structure.

In the art of manufacturing processes involving vacuum environments, cost of materials comprising the vacuum apparatus is important. Ease of setup and time to setup the vacuum apparatus are also important concerns. Reliability, such as the ability to consistently permit formation of the proper vacuum environment, and the ability to reduce waste of products processed with the vacuum apparatus, are further concerns. In addition, reducing the amount of disposable elements comprising the vacuum arrangements is important.

The above-noted prior art vacuum apparatus have inadequately, or not at all, addressed the concerns noted above. A need exists in the art for apparatus and methods which address the above concerns.

Other manufacturing processes are known which require movement of a flexible sheet against a product, such as in the case of a membrane press apparatus. In a membrane press apparatus, the product to be manufactured is outside an enclosed chamber formed between a first rigid member and a flexible sheet. The enclosed chamber is pressurized to a pressure greater than atmospheric pressure such that the flexible sheet, sometimes heated, is pressed against the product. Sometimes a vacuum assist may be provided to draw the flexible sheet toward the product. Such an arrangement is useful to manufacture wood laminates, for example, an oak laminate over a chip board.

In a membrane press apparatus, prior to pressurizing the enclosed chamber to a pressure greater than atmospheric pressure, a vacuum is sometimes applied in the enclosed chamber to draw the flexible sheet toward the first member. By heating the first member and drawing the flexible sheet toward the first member, this facilitates more rapid heating of the flexible sheet, and also moves the flexible sheet away from the product. To seal between the flexible sheet and the first member, a solid seal member is provided. A mechanical fastener grips the flexible sheet to attach the sheet to the first member. A seal is formed between the seal member and the flexible sheet through appropriate tension in the flexible sheet and/or pressing the first member and flexible sheet against a rigid work surface.

This type of membrane press arrangement is subject to problems due to the need for the extra mechanical fastener which must properly grip the flexible sheet. Also, the flexible sheet is sometimes subject to failure due to rubbing or chafing of the flexible sheet around sharp corners of the first member. It is clear that a need exists in the art for an apparatus and method which addresses these concerns.

SUMMARY OF THE INVENTION

According to the present invention, an apparatus is provided having a first member, a flexible sheet, and a cord and channel arrangement for mounting the flexible sheet to the first member to form an enclosed chamber. Valve structure is provided to communicate with the enclosed chamber to facilitate withdrawal of air from the enclosed chamber.

The valve structure is placed in airflow communication with a vacuum source for withdrawing air from the enclosed chamber to form the vacuum environment. Hereinafter, reference to "removal of air" or "withdrawal of air" is intended to include removal of air, or air and moisture, or other substances desired to be removed from the enclosed chamber through the valve structure.

According to the present invention, one aspect of the invention is to place product for exposure to a vacuum environment inside the enclosed chamber prior to completely mounting the flexible sheet to the first member. This arrangement is referred to as a vacuum frame apparatus.

In one embodiment of the invention, the channel and cord arrangement includes a channel member mounted to the first member. The channel member is positioned on the first member to define an enclosed shape, preferably comprising linear segments positioned in the shape of a rectangle, triangle, hexagon, or other regular or irregular shapes.

The channel member includes a base portion attached to the first member. Two side members extend from the base portion. The side members are spaced apart to define a groove. The groove receives a cord of the channel and cord arrangement. Positioned between the cord and the groove is a portion of the outer periphery of the flexible sheet. The side members are resiliently biased toward one another and include inwardly protruding lips to function as a gripping structure for gripping the cord and the outer periphery of the flexible sheet to hold the flexible sheet relative to the first member. Preferably, the channel member is positioned with the groove opening in a general direction perpendicular to the flexible sheet prior to mounting of the flexible sheet.

In the perimeter structure of the preferred channel member, the linear segments intersect to form a plurality of corners. Preferably, the side member of each linear channel section in each corner, on an outside of each corner, is provided with a gap to facilitate insertion of the cord around the corner.

The flexible sheet can be any elastomeric material which permits a proper vacuum environment to be formed. Preferably, the flexible sheet is made from high temperature, high tear-resistant silicone. Preferably, the channel and the cord are made from extruded silicone capable of withstanding high temperatures. In some applications, temperatures of 500 degrees Fahrenheit may be desired. In one preferred embodiment, the first member is a rigid structure made of metal, such as aluminum.

A reinforcing bar is preferably positioned along inwardly facing surfaces of the channel member to support the channel member during formation of the vacuum environment.

In some applications, the enclosed chamber can subsequently receive a pressure greater than atmospheric pressure depending upon the desired application. Such an arrangement may be useful as a membrane press.

Another aspect of the invention includes providing an apparatus having a first member, a flexible sheet, and means for mounting the flexible sheet to the first member to form an enclosed chamber. The means for mounting includes a cord and channel arrangement. Valve structure is provided to communicate with the enclosed chamber to facilitate airflow communication with the enclosed chamber. The enclosed chamber can receive either a pressure greater or less than atmospheric pressure depending upon the desired application. In some cases, such apparatus can receive a pressure less than atmospheric pressure, then a pressure greater than atmospheric pressure.

According to one aspect of the invention, product may be placed in the apparatus for exposure to a vacuum environment inside the enclosed chamber. This arrangement is referred to as a vacuum frame apparatus.

According to another aspect of the present invention, product to be manufactured may instead be positioned outside the enclosed chamber. The enclosed chamber may be capable of being pressurized with a pressure greater than atmospheric pressure to press the flexible sheet against the product. This arrangement is referred to as a membrane press apparatus.

According to the membrane press apparatus aspects of the invention, the enclosed chamber is preferably first provided with a vacuum. This permits heating of the flexible sheet when the vacuum is applied, from heat transference from the first member which is heated. The enclosed chamber is subsequently provided with the pressure greater than atmospheric pressure. The heated flexible sheet is then pressed against the product during the application of the pressure greater than atmospheric pressure to facilitate compression of the product being manufactured. A vacuum assist may be applied to facilitate pressing of the flexible sheet against the product.

A method of manufacture is also provided wherein a product is placed on a first member and a flexible sheet is placed over the product thereby positioning the product between the flexible sheet and the first member. The method further comprises positioning a cord along an outer periphery of the flexible sheet. The method further comprises inserting the cord into a channel member extending from the first member wherein the channel member mounts the flexible sheet to the first member. The method further comprises applying a vacuum to the enclosed chamber formed between the flexible sheet and the first member mounted to one another with the cord and channel arrangement.

The method further may comprise the step of heating the enclosed chamber. The method also may comprise the step of applying an external pressure to the product, external of the enclosed chamber, either through a mechanical assist or increased pressure greater than atmospheric, whether heat is applied or not.

The method further preferably comprises the step of removing the cord from the channel. The method further permits reuse of the first member and flexible sheet by positioning a second product between the first member and the flexible sheet and then repositioning the cord to insert the cord into the channel member extending from the first member to mount the flexible sheet to the first member.

Another method of manufacture according to the present invention is provided wherein a first member and a flexible sheet are mounted to one another by positioning a cord along an outer periphery of the flexible sheet member. The method further comprises the step of inserting the cord into a channel member extending from the first member wherein the channel member mounts the flexible sheet to the first member. The method further comprises the step of applying pressure different than atmospheric pressure to the enclosed chamber formed between the flexible sheet and the first member mounted to one another with the cord and channel arrangement. Such arrangement may be used as a vacuum frame apparatus or as a membrane press apparatus.

These and other advantages and features of novelty which characterize the invention are pointed out with particularity in the claims annexed hereto, and forming a part hereof. However, for a better understanding of the invention, its advantages and objects obtained by its use, reference should be had to the drawings which form a further part hereof and to the accompanying descriptive matter in which there is illustrated and described preferred embodiments of the invention.

BRIEF DESCRIPTION OF THE DRAWINGS

In the drawings, referenced numerals generally indicate corresponding parts throughout the several views.

DETAILED DESCRIPTION OF THE PRIOR ART AND THE PREFERRED EMBODIMENTS

Figure 1:
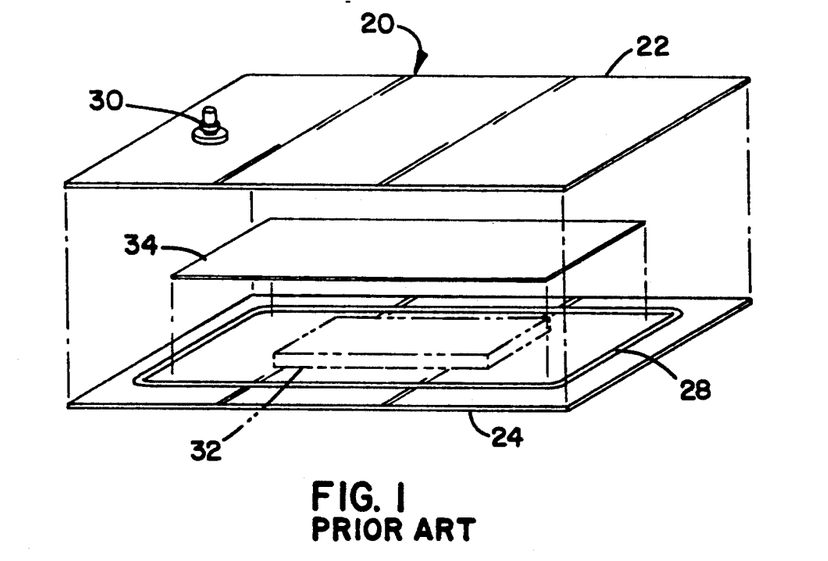
FIG. 1 is an exploded assembly perspective view of a first prior art vacuum apparatus.
Figure 2:
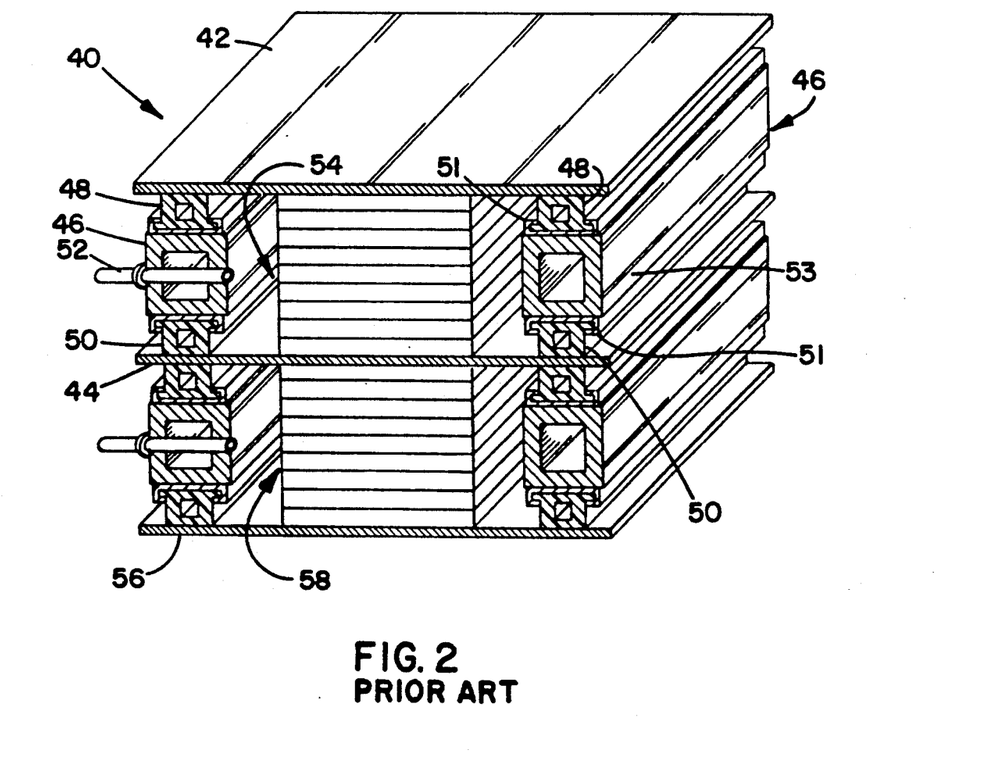
FIG. 2 is a cross-sectional view of a second prior art vacuum apparatus.
Figure 14:
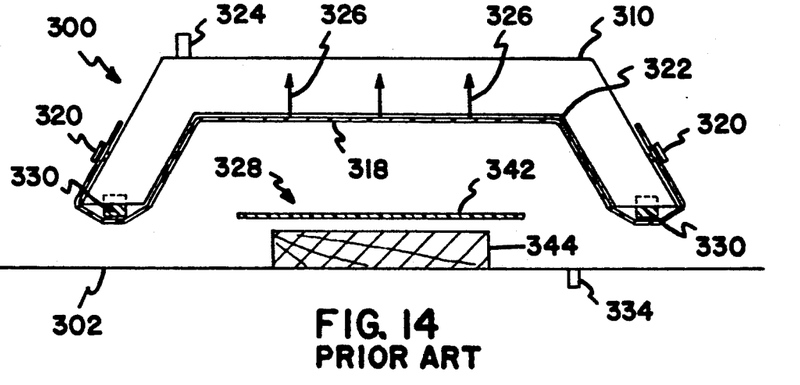
FIG. 14 is a cross-sectional view of a prior art membrane press apparatus, showing the apparatus applying a vacuum to draw the flexible sheet toward the heated first member.
Figure 15:
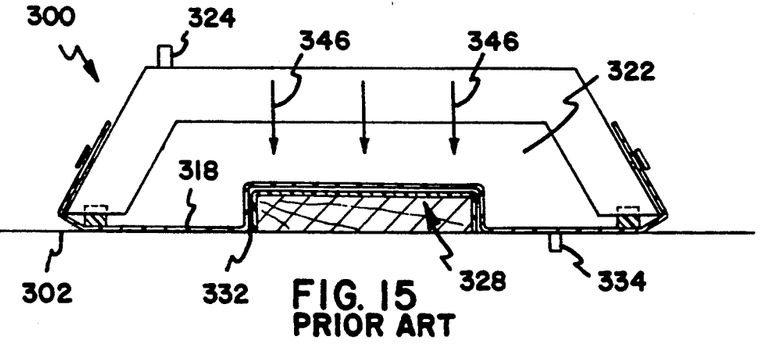
FIG. 15 is a cross-sectional view of the prior art membrane press apparatus of claim 14, showing the heated flexible sheet being pressed against the product.
Figure 16:
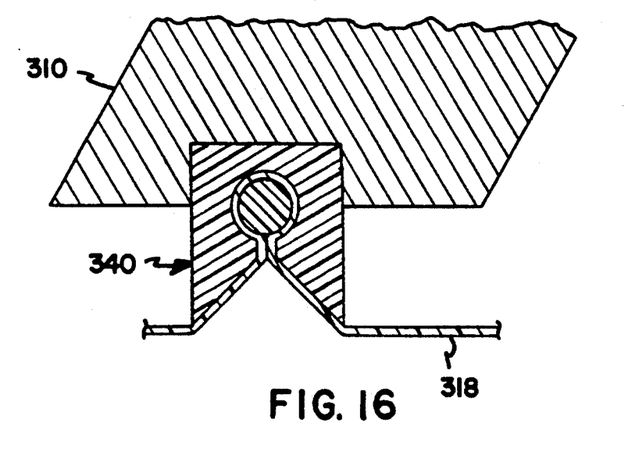
FIG. 16 is a partial cross-sectional view of a first embodiment of a membrane press apparatus according to the present invention.

FIGS. 1 and 2 illustrate two different prior art vacuum apparatus. FIGS. 3–13 illustrate various features and embodiments of the present invention for a vacuum frame apparatus, and other apparatus. FIGS. 14 and 15 illustrate a prior art membrane press apparatus. FIG. 16 illustrates features of the present invention for a membrane press apparatus, and other apparatus.

FIG. 1 illustrates an example of one known vacuum arrangement 20 for creating a vacuum environment. Vacuum arrangement 20 includes a top sheet 22 and a bottom sheet 24 adhesively bonded together with caulk 28. Product 32 is placed between top sheet 22 and bottom sheet 24 prior to completely closing vacuum arrangement 20 with the caulk. Valve 30 permits withdrawal of air from the enclosed closed chamber between top sheet 22 and bottom sheet 24. A bleeder cloth 34 may be provided to facilitate withdrawal of air from the enclosed chamber. Vacuum arrangement 20 of FIG. 1 is sometimes referred to as a "turkey bag" arrangement.

Various problems exist with vacuum arrangement 20 of FIG. 1. Arrangement 20 is not reusable. Setup prior to forming the vacuum environment can be time consuming and/or difficult. Sometimes caulk particles can be drawn into valve 30 causing problems with the vacuum supply and requiring cleaning of the valve and the vacuum supply. Another problem with arrangement 20 is that stacking of multiple packages for simultaneous manufacture is difficult, or impossible. Some bleeder cloths may break apart or release small fibers which can cause problems with the valve and the vacuum supply.

FIG. 2 illustrates an example of another known vacuum arrangement 40. Arrangement 40 includes a metal top plate 42 and a metal bottom plate 44. A seal arrangement 46 including top seal 48 and bottom seal 50 is positioned between top plate 42 and bottom plate 44. Prongs 51 mount seals 48,50 to tube 53. Product 54 is placed within the enclosed chamber between top plate 42 and bottom plate 44 and seal arrangement 46. Valve 52 is provided to withdraw air from the enclosed chamber. Another plate 56 may be added to facilitate simultaneous manufacture of a second product 58.

Vacuum arrangement 40 includes rigid top plate 42 and bottom plate 44. Therefore, neither structure can conform to a non-parallel surface on product 54. If external pressure is to be applied to the exterior of top plate 42 and bottom plate 44 to facilitate manufacturing through mechanical assistance, the height of seal arrangement 46 is critical relative to the size of product 54. In addition, seals 48,50 must be replaced after a period of time due to fatigue since typical usage produces significant deformation of the seal structure.

Referring now to FIGS. 3–13, preferred embodiments of a vacuum frame apparatus, or apparatus 100, are shown according to principles of the present invention. As shown in the preferred embodiment of FIG. 3 (exploded view), apparatus 100 includes a base member, or first member 102 with a channel member 104 positioned on and mounted to base member 102. Channel member 104 includes a groove 106, which is continuous around the shape defined by the channel member 104.

Figure 3:
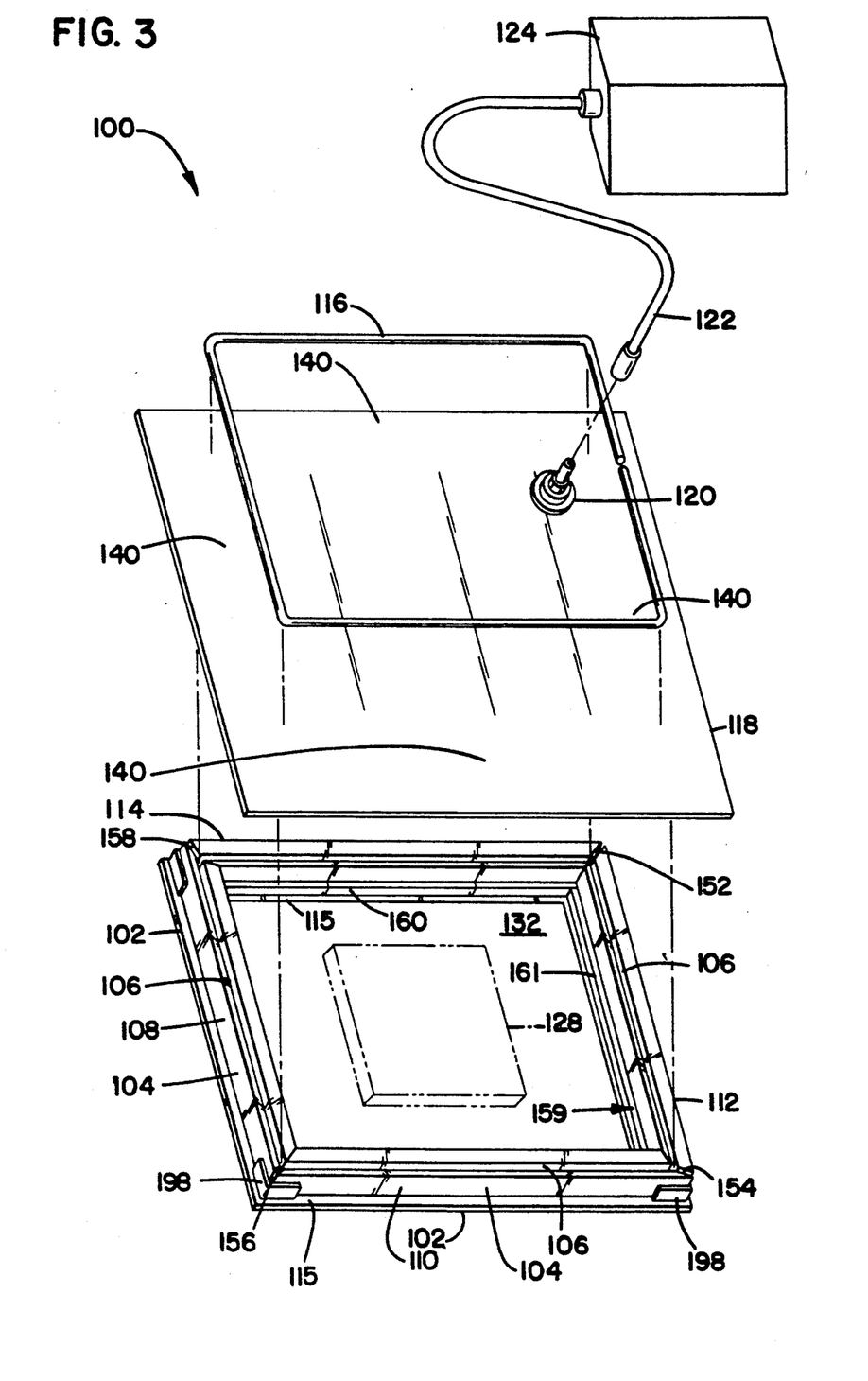
FIG. 3 is an exploded assembly perspective view of a first embodiment of a vacuum frame apparatus according to the present invention.

In the embodiment shown in FIG. 3, channel member 104 is comprised of four separate channel sections 108, 110, 112, and 114 which are assembled to form the continuous channel member 104. Sections 108, 110, 112, and 114 are preferably linear. Preferably, base member 102 includes a planar top surface 115 for supporting channel member 104, with groove 106 opening in a direction perpendicular to top surface 115.

During use of apparatus 100 in manufacturing processes requiring a vacuum environment, a product 128 as shown in FIG. 3 is positioned directly, or indirectly, on the top surface 115 of base member 102. In some cases, a bleeder cloth 132 is positioned between product 128 and top surface 115 of base member 102.

As shown in FIG. 3, apparatus 100 further comprises a flexible sheet 118 which defines an outer perimeter larger than the shape defined by the channel member 104. Flexible sheet 118 is mounted to channel member 104 with cord 116. By inserting cord 116 into groove 106 with an outer periphery 140 of flexible sheet 118 positioned between cord 116 and groove 106, flexible sheet 118 is mounted to base member 102. The preferred cross-sectional shape of cord 116 and groove 106 is circular.

Figure 7:
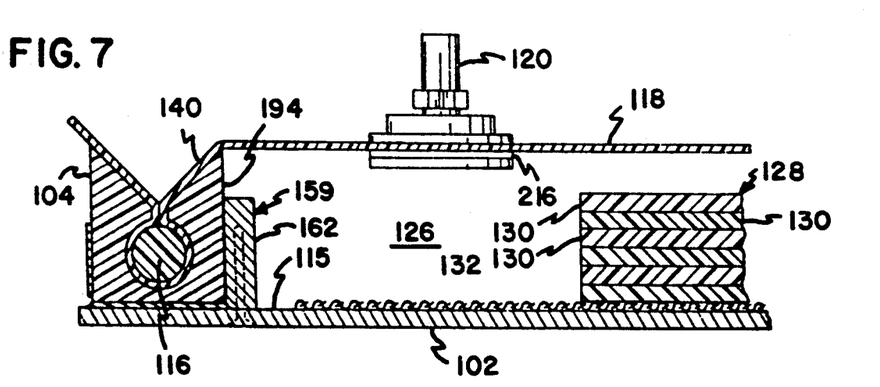
FIG. 7 is a cross-sectional side view of a portion of the vacuum frame apparatus shown in FIG. 1 in the assembled state prior to applying the vacuum.

As will be discussed in greater detail below, FIG. 7 illustrates the flexible sheet 118 mounted to channel member 104 with cord 116 positioned in groove 106. Once flexible sheet 118 is mounted to channel member 104, an enclosed chamber 126 is created between flexible sheet 118 and base member 102 (see FIG. 7). As shown in FIG. 7, product 128 may include a plurality of layers 130 to be adhesively joined during a manufacturing process wherein a vacuum is applied to the enclosed chamber 126 to facilitate removal of air from between the layers. Product 128 may alternatively be any product to be manufactured wherein a vacuum environment is required.

For the purposes of providing enclosed chamber 126 (see FIG. 7) with a vacuum environment, valve structure is provided to communicate with enclosed chamber 126 to permit withdrawal of air, and moisture, from enclosed chamber 126. As shown in FIGS. 3 and 7, valve 120 is provided through flexible sheet 118. Hose 122 connects valve 120 to a vacuum supply from vacuum pump 124 (see FIG. 3). By running vacuum pump 124, suction is applied through valve 120 to withdraw air, and possibly moisture or other substances, from enclosed chamber 126.

By providing a cord and channel arrangement including cord 116 and channel member 104, an advantageous apparatus 100 is provided. The cord and channel arrangement permits rapid setup to form the enclosed chamber 126 for subsequent exposure to a vacuum. The cord and channel arrangement further permits reusability of apparatus 100. In addition, apparatus 100 with the cord and channel arrangement provides structure which permits a proper vacuum environment to be created within the enclosed chamber 126. If valve structure is provided with closure means, in some applications, the vacuum supply may be removed from communication with the enclosed chamber 126 and the chamber will still maintain a sufficient vacuum environment for a period of time.

As shown in FIGS. 3 and 7, a bleeder cloth 132 may be provided to facilitate evacuation of air from enclosed chamber 126. Bleeder cloth 132 helps facilitate more complete evacuation of air from the enclosed chamber 126 by preventing flexible sheet 118 from forming air pockets against base member 102 which are not in airflow communication with valve 120. Bleeder cloth 132 also helps prevent valve 120 from sealing against top surface 115 before a sufficient vacuum environment is formed. In some cases, a small bleeder cloth may be used directly under valve 120 to prevent valve 120 from sealing against base member 102. Instead, valve 120 can be provided with a groove structure on a lower surface which engages base member 102. The grooves prevent valve 120 from sealing against base member 102.

Figure 4:
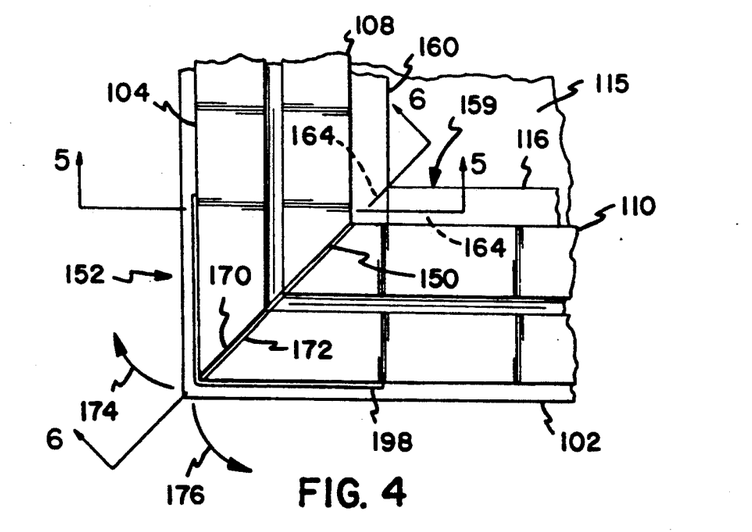
FIG. 4 is an enlarged top view of a corner portion of the base member and the channel member of the apparatus shown in FIG. 3.
Figure 5:
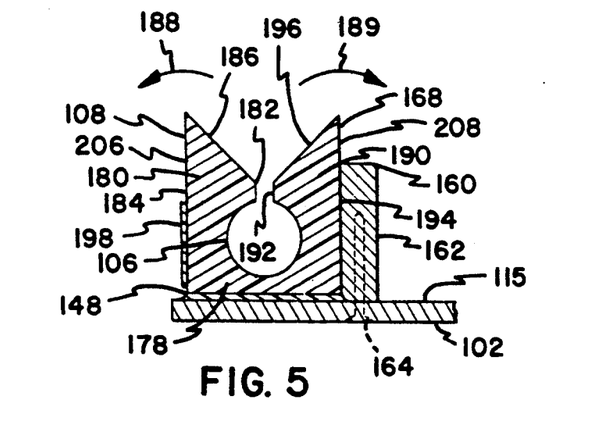
FIG. 5 is a cross-sectional view of a portion of FIG. 4 along lines 5—5.
Figure 6:
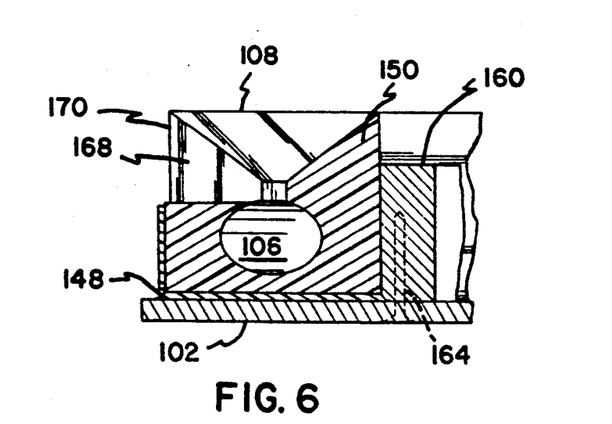
FIG. 6 is a cross-sectional view of FIG. 4 along lines 6—6.

Referring now to FIGS. 4–6, structure of base member 102 and channel member 104 are shown in greater detail. FIG. 4 shows a corner 152 formed by the intersection of first channel section 108 and second channel section 110 of channel member 104. Corner 152 is typical of all the corners formed around the rectangular shaped defined by channel member 104 in the embodiment of FIG. 3.

It is to be appreciated that channel member 104 can have a variety of shapes comprising linear segments which intersect to form a plurality of corners. Triangular and hexagonal shapes are anticipated. Irregular shapes comprising a plurality of linear segments are also possible. In other words, linear segments and angled corners of any angles less than 180 degrees are anticipated for the enclosed shape of channel member 104.

Sealant 150 is used to join first section 108 to second section 110. Reinforcing tape 198 is preferably provided on an outwardly facing side surface of first section 108 and second section 110 to strengthen corner 152.

As shown in FIG. 5, a cross-section of first section 108 of channel member 104 is shown. It is to be appreciated that sections 110, 112, 114 comprising the rest of channel member 104 are substantially similar.

In FIG. 5, first section 108 of channel member 104 includes a base region 178 with two upwardly extending side portions 180, 190. Spaced between side portions 180, 190 is groove 106 for receiving cord 116 and a portion of sheet 118. Lip 182 on side portion 180 and lip 192 on side portion 190 help retain cord 116 with the portion of the flexible sheet 118 during operation. Side portion 180 further defines an outwardly facing outside surface 184 to channel member 104. Side portion 190 defines an inwardly facing inside surface 194, at least a portion of which forms one of the boundaries of the enclosed chamber 126.

To facilitate ease of set up, side portions 180, 190 are provided with alignment surfaces 186, 196 which slope toward groove 106. To position cord 116 and a portion of flexible sheet 118 in groove 106 in FIG. 5, end 206 of side portion 180 and end 208 of side portion 190 are moved in the direction of arrows 188, 189 to move each lip 182, 192 toward a further spaced apart distance to receive cord 116 and a portion of flexible sheet 118 (cord 116 and sheet 118 are not shown in FIG. 5).

To join first portion 108 of channel member 104 to an outer periphery 146 of base member 102, a sealant layer 148 is provided to adhesively attach opposing surfaces as shown in FIGS. 5 and 6. Sealant layer 148 also mounts portion 110, 112, and 114 to base member 102.

Referring now to FIG. 6, a cross-sectional view of corner 152 is shown through sealant 150 used to join first section 108 to second section 110. As shown in FIG. 6, sealant 150 does not completely join the end surfaces of each channel section. Upper corner portion 170 of first channel section 108 is not adhesively attached to an upper corner portion 172 of second channel section 110 (see FIG. 4). In FIG. 6, open surface portion 168 is not adhesively attached to any other surface. As represented in FIG. 4, upper corner portion 170 and upper corner portion 172 are movable in the direction of arrows 174, 176 to facilitate bending of cord 116 around corner 152. This permits a continuous cord 116 to be used around channel member 104 provided with angled corners such the right-angled corners shown. Without the open upper corner portion of channel member 104, positioning of a continuous cord 116 in groove 106 during setup may be difficult.

Figure 8:
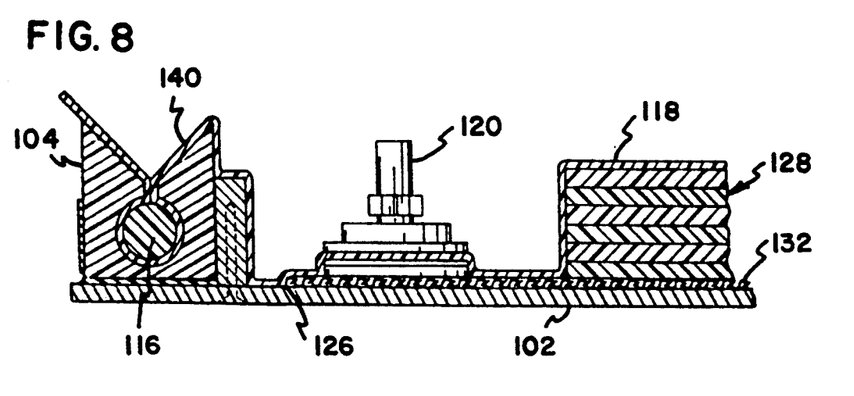
FIG. 8 is a cross-sectional side view like FIG. 7 showing the vacuum frame apparatus with the vacuum at least partially applied.
Figure 9:
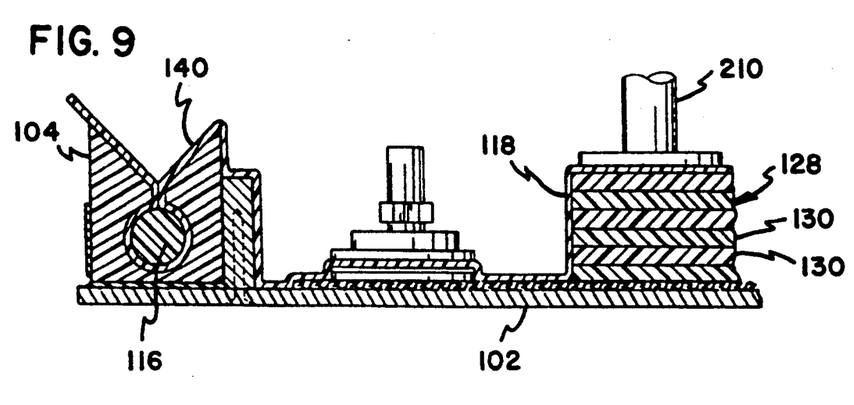
FIG. 9 is a cross-sectional side view like that shown in FIG. 8 with a mechanical ram applying an external force to the product.

Referring now to FIGS. 7–9, apparatus 100 is shown in various stages of use. In FIG. 7, flexible sheet 118 is positioned to form enclosed chamber 126 between flexible sheet 118 and base member 102. Product 128 with layers 130 is positioned in chamber 126 for exposure to a vacuum environment. In the present invention, a vacuum environment is considered to be any pressure less than atmospheric pressure.

Apparatus 100 preferably includes reinforcing structure 159 along the inner perimeter of channel member 104 (See FIGS. 3–7 in particular). Structure 159 at least partially, and preferably completely, surrounds the inner perimeter of channel member 104. Structure 159 provides support for maintaining the inner side portions 190 of each channel section of channel member 104 in a substantially upright position when the enclosed chamber 126 is under a vacuum environment. This helps prevent the side portions 180,190 from moving to a wider spaced apart position and possibly permitting the cord 116 to become removed from the groove 106. It is believed that the preferred embodiment shown in FIG. 3 works better if structure 159 or similar support structure is provided. This may be true especially for small apparatus 100 where the flexible sheet 118 is not able to stretch as much relative to cord 106 and channel member 104. However, it is to be appreciated that the present invention including an apparatus 100 without any reinforcing structure 159 can work adequately in some applications.

Structure 159 comprises a plurality of reinforcing bars 160, 161 which are attached to base member 102 through attachment means such as with a plurality of screws 164 (See FIGS. 3 and 4). In the preferred embodiment of apparatus 100, four bars comprise structure 159. Two are not visible in FIG. 3. In each corner, bars 160, 161 may form joints with ends at 45 degrees (not shown). Alternatively, 90 degree ends of each bar 160, 161 may butt up against each other as shown in FIG. 4. Bars 160, 161 may be made of any of a variety of materials such as metal or polymeric materials. Bars 160, 161 should not be higher than tip 168 of channel member 104. In the preferred embodiment, the bars are about ¼ to ½ inches or more from the top of tip 168. Bar 161 in FIG. 4 is not shown in FIG. 5 for clarity purposes.

After a vacuum is applied to valve 120, air, and possibly moisture or other substances, is withdrawn from enclosed chamber 126 thereby drawing flexible sheet 118 toward base member 102 as shown in FIG. 8. It is believed that, as the vacuum is formed in enclosed chamber 126, a seal is at least in part formed adjacent cord and channel arrangement mounting the flexible sheet 118 to base member 102. In particular, it is believed that a seal is at least in part formed along inside surface 194 of channel member 104, along tip 168, and along inside surface portion 162 of reinforcing structure 159.

As the vacuum is applied to enclosed chamber 126, the individual layers 130 of product 128 are exposed to the vacuum environment thereby facilitating withdrawal of at least a portion of any air positioned between the layers 130. Heat may be further applied to facilitate further steps in a desired manufacturing process, such as bonding of any adhesive used to join the layers.

As shown in FIG. 9, a mechanical ram 210 may be used to apply an external force to the layers 130 of product 128 to facilitate compression of the layers 130 together. Stacking of a plurality of apparatus is possible for simultaneous manufacture. In that case, product 128 must be sufficiently tall such that base member 102 of the apparatus directly above product 128 applies a compressive force on product 128. In other words, the height of product 128 relative to the height of channel member 104 is important for simultaneous manufacture with mechanical assistance.

In some instances, a mechanical ram may not be usable due to a risk of damage to product 128 from the application of the external force, or for other reasons. Instead, apparatus 100 may be placed in an autoclave, or other device with a pressure chamber, and exposed to increased pressure external of the enclosed chamber. The autoclave may also expose apparatus 100 and product 32 to heat. The external pressured applied to apparatus 100 in an autoclave applies a more gentle force on a product 128 than sometimes is the case with mechanical ram 210. The use of an autoclave may be appropriate when manufacturing fragile components such as printed circuit boards. The autoclave may also be useful in manufacturing non-planer structures.

Flexible sheet 118 can be any of a variety of elastomeric materials that permit a vacuum environment in enclosed chamber 126 to be formed. In the preferred embodiment, flexible sheet 118 is made of a high cut and tear resistant silicone elastomer. Preferably, flexible sheet 118 can withstand high temperatures of 500° F. These temperatures are often necessary to facilitate manufacturing of some laminate structures. It has been found that some specific types of sheet 118 that are useful in the present invention are silicone sheets made by Furon-CHR Division of New Haven, Conn., and designated CHR9255 or CHR9235, 1/16 inch thick. It is to be noted that if flexible sheet 118 is too thick, such as ⅛ inch in the preferred system shown, the flexible sheet may pull the cord 116 out of groove 106. It is believed that flexible sheet 118 having a hardness of between 35 to 55 Durometer Shore A works well. Due to the flexibility of sheet 118, sheet 118 can conform to some non-planar shaped products 128 during operation.

In the preferred embodiment, channel member 104 is a high temperature silicone (able to withstand temperatures up to 500° F.) with about a 70 Durometer Shore A hardness. In the preferred embodiment, cord 116 is a high temperature silicone and has a hardness of about 80 Durometer Shore A. It has been found that extrusions of the channel member 104 and the cord 116 with these hardnesses work well. Mounting of the cord into the channel works well if the cord has a greater hardness than the channel. Silicone extrusions made by Furon-Performance Elastomers Division of Sunnyvale, Calif., work well.

In the preferred embodiment, sealant 150 used to join adjacent channel sections to form channel member 104 and sealant 148 to attach channel member 104 to base member 102 comprises a room temperature vulcanization silicone bonding agent. Tape 198 preferably comprises a reinforcing silicone coated fabric adhesively bonded to the corners.

Valve 120 can be any of a variety of known valves that permit airflow communication with the enclosed chamber 126. Valve 120 should permit mounting to sheet 118 in a manner that permits the proper vacuum environment to be formed. A reinforcing elastomeric ring 216 may be necessary to facilitate mounting of valve 120 to flexible sheet 118 (see FIG. 7). Valve 120 may include a two part mounting arrangement that threadably joins a top half to a bottom half, with the flexible sheet, and possibly the reinforcing ring if provided, clamped between the threadably joined top and bottom halves. Preferably, valve 120 also includes self-biased closure structure to permit disconnection of vacuum supply through hose 122 to maintain the vacuum environment in the enclosed chamber 126 at least in part at least temporarily.

Figure 13:
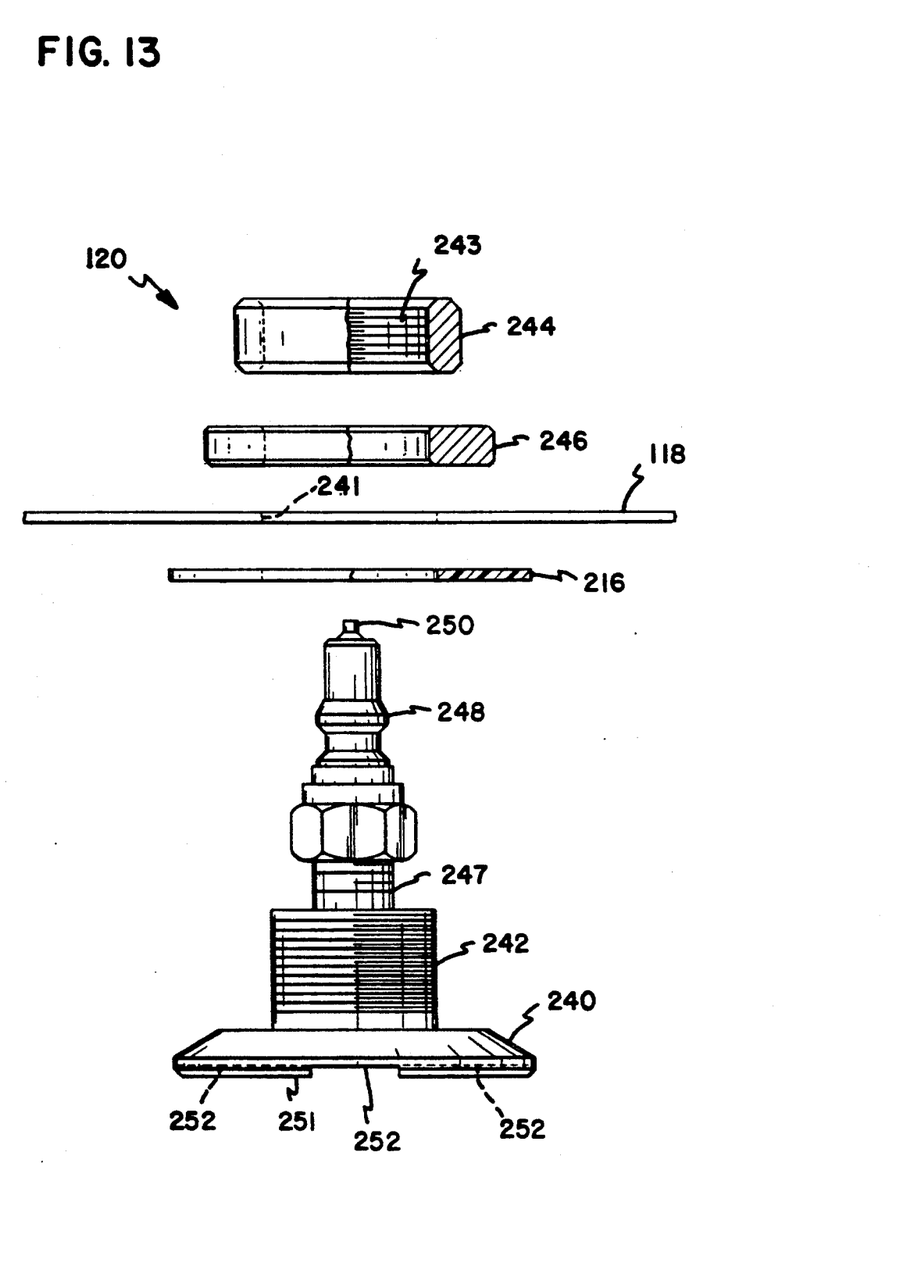
FIG. 13 is an exploded and enlarged, partial cross-sectional view in greater detail of one preferred embodiment of the valve structure present in the embodiment of the apparatus shown in FIGS. 3–9.

FIG. 13 shows in greater detail one preferred structure of valve 120. Bottom 240 is provided with threads 242 for engaging threads 243 on ring 244 to mount valve 120 to flexible sheet 118 through an opening 241 in flexible sheet 118. Washer 246 is positioned on top of flexible sheet 118 between ring 244 and flexible sheet 118. Reinforcing ring 216 is positioned between flexible sheet 118 and bottom 240. Threadably attached to bottom 240 on an upper end 247 of bottom 240 is nozzle structure 248. Valve tip 250 is biased toward a closed position to permit disconnection of the vacuum source from valve 120 to maintain at least partially the vacuum environment in enclosed chamber 126. A lower surface 251 of bottom 240 is provided with grooves 252 that help prevent sealing of valve 120 against base member 102. Valve 120 opens into enclosed chamber 126 though an opening in lower surface 251 of bottom 240. Preferably, valve 120 is comprised of metal components.

In the present invention, vacuum frame apparatus 100 can achieve a vacuum environment in the range of 20 to 29 inches of mercury. In addition, if the vacuum source is removed from valve 120, apparatus 100 may in some cases maintain a sufficient vacuum for at least several hours or more. This facilitates additional flexibility in manufacturing since apparatus 100 does not require continuous connection to the vacuum supply to maintain a vacuum environment.

Base member. 102 may be made from any of a variety of materials. One preferred material is aluminum, ⅜ inches thick. Other metals or plastics are also anticipated. Base member 102 may have any of a variety of different sizes such as 2 feet by 2 feet or smaller up to 4 feet by 8 feet or larger. Because base member 102 is rigid, ease of transport and durability are provided. Also, rigid base member 102 permits stacking of multiple apparatus 100 to simultaneous manufacture product in each apparatus 100. A rigid base member 102 also is believed to facilitate the formation of a proper vacuum environment since base member 102 helps maintain channel member 104 substantially upright (with groove 106 opening perpendicular to top surface 115) during formation and maintenance of the vacuum environment in enclosed chamber 126.

Bleeder cloth 132 shown in FIGS. 3 and 7-9 can be any of a variety materials that prevent valve 120 from sealing against base member 102 and permit a proper vacuum environment to be formed. Bleeder cloth also helps prevent sheet 118 from sealing against base member 102 and forming air pockets not in airflow communication with valve 120. One preferred bleeder cloth 132 is a Teflon coated cloth which is believed to reduce or eliminate loose particulate from separating from bleeder cloth 132 and becoming trapped in valve 120 or vacuum supply 124.

Figure 10:
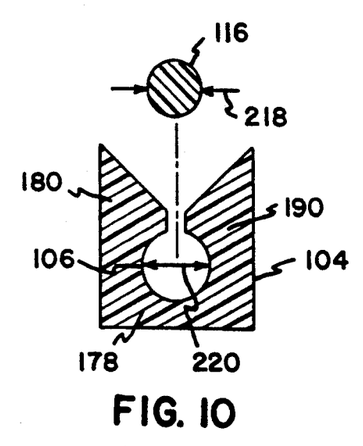
FIG. 10 is a cross-sectional view of the channel member and the cord shown in the embodiment of FIGS. 3–9.
Figure 11:
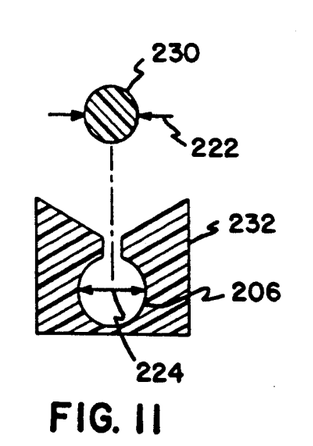
FIG. 11 is an alternative arrangement for the channel member and the cord, instead of the arrangement shown in FIG. 10.

Referring now to FIGS. 10 and 11, some preferred dimensions of two embodiments of the cord and channel arrangement are provided. FIG. 10 illustrates in cross-section cord 116 and channel member 104 shown in the preferred embodiment of FIGS. 3-9. Groove 106 is provided with approximately a ⅜ inch diameter 220 and cord 116 is provided with approximately a ½ inch diameter 218. The width of channel member 104 along the base portion 178 is approximately 1 3/16 inches. The height of channel member 104 along side portions 180,190 is approximately 1 9/16 inches.

FIG. 11 represents an alternative cord and channel arrangement wherein cord 230 is provided with approximately a ⅜ inch diameter 222 and groove 206 is provided with approximately a ½ inch diameter 224. About a 1.0 inch height and about a 1.0 inch width of channel member 232 are provided. The structure of FIG. 11 may be used for manufacturing products having a smaller height when resting on base member 102. In some cases, the height of the product being manufactured with apparatus 100 is important in relation to the height of channel member 104,204. In some cases, multiple apparatus 100 are provided in a stacked relation to facilitate external force application for bonding the layers in each product in each apparatus 100, for example.

Figure 12:
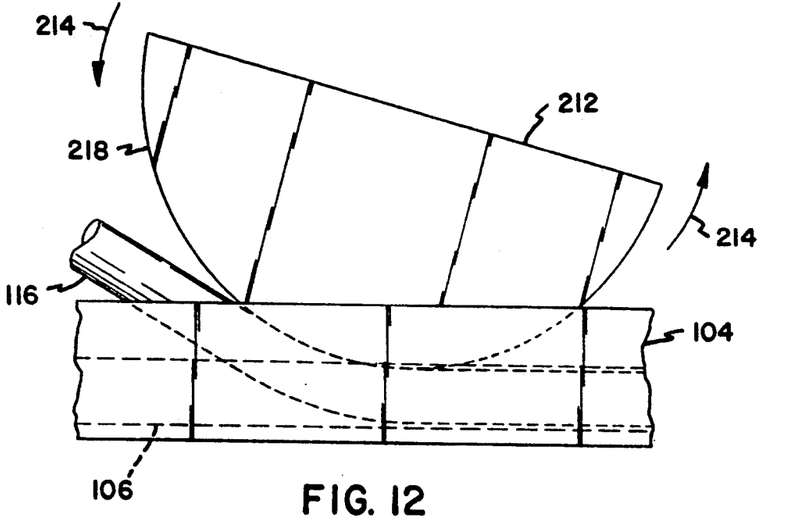
FIG. 12 is an illustration of a portion of the channel member, a portion of the cord and a tool for use in positioning the cord within the groove of the channel member. For illustration purposes, the flexible sheet is not shown positioned between the cord and the groove of the channel member.

FIG. 12 illustrates a tool and technique for facilitating consistent and proper placement of cord 116 in groove 106 of channel member 104. Tool 212, with rounded surface 218, is positioned and applied with a rotational movement (in the direction of arrows 214) to push cord 116 into groove 106. For illustration purposes, flexible sheet 118 is not shown in FIG. 12.

As noted in FIG. 7, in the initial position, flexible sheet 118 is tight across the enclosed chamber 126. It is to be appreciated that such is often the natural result of positioning of flexible sheet 118 across channel member 104 then positioning cord 116 in groove 106. Various tensions are anticipated for sheet 118 to achieve adequate seal and vacuum environment.

The present invention provides reusability due to the channel and cord arrangement, not possible with some prior vacuum apparatus. Time and effort to set up and dismantle are reduced compared to some previous vacuum apparatus since the present invention using the cord and channel arrangement to attach the flexible sheet to the base member is easy to setup and easy to dismantle. The cord and channel permits formation of the proper seal between the base member and the flexible sheet during operation. In some cases, the cord and channel seal permits retention of vacuum pressure over an extended period of time without vacuum assist, such as for periods of up to 12 hours or more.

Additional uses of the channel and cord arrangement described above are anticipated in combination with a flexible sheet for forming an enclosed chamber for pressurization at pressures greater and/or less than atmospheric pressure. One such use is shown in FIGS. 14-16. FIG. 16 is an embodiment of the present invention relating to a membrane press apparatus used to manufacture such products as wood products including a laminate structure. FIGS. 14 and 15 illustrate a prior art membrane press apparatus 300.

Referring now to FIG. 14, membrane press apparatus 300 includes a first member 310, preferably heated. Heated first member 310 is movable toward and away from work surface 302. A flexible sheet 318 is mounted to the heated member 310 with mechanical fasteners 320 to form a first enclosed chamber 322 adapted for pressurization.

During use, a vacuum is applied to chamber 322 between the heated member 310 and the flexible sheet 318 through valve 324 connected to a vacuum supply (not shown). As shown in FIG. 14, the vacuum draws the flexible sheet 318 up toward heated member 310, which is heated above room temperature. Airflow arrows 326 show the movement of air from first enclosed chamber 322 toward valve 324.

Referring now to FIG. 15, after a sufficient time passes, enclosed chamber 322 between the heated member 310 and the flexible sheet 318 is pressurized to a pressure greater than atmospheric pressure to push the flexible sheet against a product 328 to be laminated, such as to adhere an outer layer 342 of oak laminate to an inner particle board or chip board layer 344. Airflow arrows 346 show the movement of air to first enclosed chamber 322 from valve 324.

A second enclosed chamber 332 is formed between flexible sheet 318 and work surface 302 by moving heated member 310 toward work surface 302 as in the position in FIG. 15. A vacuum assist may be provided through second valve 334 to provide second enclosed chamber 332 with a vacuum environment and/or to permit withdrawal of air from the second enclosed chamber 332.

In the apparatus 300, seal 330 is a solid seal. Seal 330 engages flexible sheet 318 and permits a seal to be formed for the enclosed chamber 322 between the heated member 310 and the flexible sheet 318. Seal 330 also permits formation of a seal between work surface 302 and flexible sheet 318 for second enclosed chamber 332. Work surface 302 acts as a stop to limit movement of flexible sheet 318 away from first member 310.

The flexible sheet 318 is manually clamped to the outside of the heated member 310 with mechanical fasteners 320 to hold the sheet in position before heated member 310 is moved downward toward work surface 302. This mounting arrangement sometimes results in chafing or rubbing on the flexible sheet adjacent the outside corners of the heated member 310.

One aspect of the present invention is to replace the seal 330 with a cord and channel arrangement 340 as shown in FIG. 16. By providing a cord and channel arrangement 340, the present invention may improve existing membrane press apparatus 300. By using the cord and channel arrangement, the chafing that occurred on the outside corner may be reduced, or eliminated. In addition, the flexible sheet can be mounted, changed or rearranged quickly with the use of the cord and channel arrangement and held in proper position for use. It is believed that cord and channel arrangement 340 permits formation of the proper seals for the first enclosed chamber 322 and the second enclosed chamber 332. Cord and channel arrangement 340 is intended to include many, and in some cases all, of the features of cord 116 and channel member 104 described previously.

It is to be appreciated that various modifications of the present invention are anticipated. One such modification is to move valve 120 from flexible sheet 118 to exit through a side of apparatus 100, such as through channel member 104, between groove 106 and sealant layer 148. This modification is not shown in the drawings.

Alternatively, a manifold structure may be provided to connect the vacuum through base member 102 to link the enclosed chamber with an exterior of apparatus 100. In that case, an opening would be provided through top surface 115 in airflow communication with the vacuum supply through the manifold structure. This modification is not shown in the drawings.

By exiting the valve 120 at a side rather than a top (through flexible sheet 118), stacking of multiple apparatus 100 may in some cases be easier. Further, the application of an external mechanical force may be easier in some cases if the valve is provided through a side of the structure of apparatus 100. By venting the valve structure through the side, multiple stacking is possible wherein a valve structure of each apparatus can be linked to a common point and then the common point connected to the vacuum supply. In some manufacturing applications, this arrangement may be advantageous.

It is further noted that in some cases a groove pattern may be provided in top surface 115 of base member 102 to facilitate proper evacuation of the enclosed chamber. Small grooves such as 40/1000 inch deep may be used in a cross hatch pattern spaced at one or more inches apart.

The groove pattern may in some cases be supplemented with multiple ports entering enclosed chamber 126 through top surface 115, as described above for the side port mounting arrangement. In some cases, this can be used instead of a bleeder cloth to facilitate proper evacuation of air from enclosed chamber 126. These modifications to base member 102 shown in FIGS. 3-9 may eliminate the need for the bleeder cloth 132 and help facilitate proper air evacuation from enclosed chamber 126 by preventing air pockets from being cut off from airflow communication with the vacuum supply. These modifications are not shown in the drawings.

It is to be understood, that even though numerous characteristics and advantages of the invention have been set forth in the foregoing description, together with details of the structure and function of the invention, the disclosure is illustrative only, and changes may be made in detail, especially in matters in shape, size, and arrangement of the parts within the principles of the invention to the full extent indicated by the broad general meaning of the terms in which the appended claims are expressed.

What is claimed is:

1. A vacuum apparatus for forming a vacuum environment comprising:
   a flexible sheet with an outer periphery;
   a first base member;
   a channel member extending from the first member, the channel member being located at the periphery of said first base member defining a completely enclosed shape, the channel member including two side members spaced apart to define a groove, the side members including retaining means for retaining a cord and a portion of the outer periphery of the flexible sheet positioned in the groove, at least one of said side members being a flexible side member wherein the flexible side member is movable in a direction away from the other side member;
   a cord, the cord receivable by the groove, at least a portion of the outer periphery of the flexible sheet positioned between the cord and the groove to mount the flexible sheet to the first member thereby defining a substantially enclosed chamber between the flexible sheet and the first member, the flexible side member permitting receipt of the cord and the portion of the outer periphery of the flexible sheet in the groove; and valve means interconnected to the enclosed chamber for permitting withdrawal of air from the enclosed chamber.

2. The apparatus of claim 1, further comprising vacuum means attached to the valve means, the vacuum means withdrawing air from the enclosed chamber through the valve means.

3. The apparatus of claim 1, wherein the channel member includes linear segments intersecting to define a plurality of corners.

4. The apparatus of claim 3, wherein one of the corners is formed by a first linear channel section and a second linear channel section, the first linear channel section being sealably joined to the second linear channel section along a portion of an end of each channel section, the corner being provided with a gap to permit outward flexing of an outwardly disposed side member of each channel section to facilitate bending of a continuous cord around the corner.

5. The apparatus of claim 1, wherein the side members of the channel member are resiliently biased toward one another.

6. The apparatus of claim 5, further comprising reinforcing means for limiting one of the side members from moving in a direction away from the opposing side member.

7. The apparatus of claim 1, wherein the flexible sheet comprises an elastomeric material.

8. The apparatus of claim 7, wherein the flexible sheet comprises silicone.

9. The apparatus of claim 8, wherein the channel member comprises silicone, and wherein the cord comprises silicone.

10. The apparatus of claim 9, wherein the silicone comprising the cord has a greater hardness than the silicone comprising the channel member.

11. The apparatus of claim 9, wherein the first member includes a metal portion with the channel member mounted to the metal portion.

12. The apparatus of claim 1, wherein the valve means permits airflow to subsequently enter the enclosed chamber following withdrawal of air, to pressurize the enclosed chamber to a pressure greater than atmospheric pressure.

13. An apparatus for forming a pressure environment different from atmospheric pressure comprising:
   a flexible sheet;
   a first base member;
   means for mounting the flexible sheet to the first member to define an enclosed chamber, wherein the means includes a cord member and a channel member, the channel member being mounted to said first base member at its periphery, the channel member defining a completely enclosed shape, the channel member including two side members, at least one of which is deformable away from the other, the two side members defining a groove for receiving the cord member and a portion of the flexible sheet positioned between the channel member and the cord member to mount the flexible sheet to the first member; and valve means interconnected to the enclosed chamber for permitting airflow communication with the enclosed chamber to pressurize the enclosed chamber at a pressure different from atmospheric pressure.

14. The apparatus of claim 13, wherein the valve means permits airflow to exit the enclosed chamber to pressurize the enclosed chamber to a pressure less than atmospheric pressure.

15. The apparatus of claim 13, wherein the valve means permits airflow to enter the enclosed chamber to pressurize the enclosed chamber to a pressure greater than atmospheric pressure.

16. The apparatus of claim 13, wherein the enclosed chamber is adapted to first receive a pressure less than atmospheric pressure through the valve means, and wherein the enclosed chamber is further adapted to subsequently receive a pressure greater than atmospheric pressure through the valve means.

17. An apparatus for mounting a flexible sheet with an outer periphery to a first base member for forming an enclosed chamber for receiving and maintaining a pressure environment different than atmospheric pressure therebetween, the apparatus comprising:
   a channel member extending from said first base member at its periphery and comprising extruded silicone, the channel member having a base surface for mounting to the first member and the channel member further defining a completely enclosed shape on the first member, the channel member including two resilient side members spaced apart to define a groove, the side members each including an inwardly protruding lip facing one another at least one of said side member is movable in a direction away from the other side member;
   a cord comprising extruded silicone, the cord receivable by the groove, at least a portion of the outer periphery of the flexible sheet positioned between the cord and the groove, the lip of each side member cooperating to mount the flexible sheet to the first member thereby defining the enclosed chamber between the flexible sheet and the first member.

18. The apparatus of claim 17, wherein the extruded silicone comprising the channel member and the extruded silicone comprising the cord is capable of withstanding temperatures of about 500 degrees Fahrenheit and wherein the cord and channel permit receipt and maintenance of the pressure environment different than atmospheric pressure in the enclosed chamber in a temperature environment of about 500 degrees Fahrenheit.

* * * * *